US012605798B1

(12) United States Patent
Tanaka

(10) Patent No.: US 12,605,798 B1
(45) Date of Patent: Apr. 21, 2026

(54) MACHINE TOOL, MACHINING PATH GENERATION METHOD, AND RECORDING MEDIUM

(71) Applicant: BROTHER KOGYO KABUSHIKI KAISHA, Nagoya (JP)

(72) Inventor: Hiroyuki Tanaka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 853 days.

(21) Appl. No.: 17/951,832

(22) Filed: Sep. 23, 2022

Related U.S. Application Data

(63) Continuation of application No. PCT/JP2021/012031, filed on Mar. 23, 2021.

(30) Foreign Application Priority Data

Mar. 31, 2020 (JP) ................................. 2020-064097

(51) Int. Cl.
| | |
|---|---|
| *B23Q 15/013* | (2006.01) |
| *B23Q 15/18* | (2006.01) |
| *B23Q 17/09* | (2006.01) |
| *B23Q 17/22* | (2006.01) |

(52) U.S. Cl.
CPC .......... *B23Q 15/013* (2013.01); *B23Q 15/18* (2013.01); *B23Q 17/0961* (2013.01); *B23Q 17/0966* (2013.01); *B23Q 17/2241* (2013.01)

(58) Field of Classification Search
CPC .. B23Q 15/013; B23Q 15/18; B23Q 17/0961; B23Q 17/0966
See application file for complete search history.

(56) References Cited

U.S. PATENT DOCUMENTS

| | | | | |
|---|---|---|---|---|
| 2002/0197122 | A1* | 12/2002 | Mizutani | ............ G05B 19/4015 |
| | | | | 82/1.11 |
| 2014/0379117 | A1* | 12/2014 | Nishimura | |
| 2018/0239337 | A1* | 8/2018 | Hamm | ............. G05B 19/40937 |

FOREIGN PATENT DOCUMENTS

| | | |
|---|---|---|
| CN | 102198607 A | 9/2011 |
| CN | 107065768 A | 8/2017 |
| CN | 108620952 A | 10/2018 |

(Continued)

OTHER PUBLICATIONS

Shunsuke, Machining method with rotary tool, 2002, google patents , note this is a machine translation of JP2002205243 (Year: 2002).*

(Continued)

*Primary Examiner* — Christopher E. Everett
*Assistant Examiner* — Yvonne Trang Follansbee
(74) *Attorney, Agent, or Firm* — Oliff PLC

(57) ABSTRACT

A machine tool includes a spindle having a tip on which a tool is mounted, a moving portion configured to move the spindle, on which a tool is mounted, toward a peripheral edge of a master workpiece or away from the peripheral edge along a reference path on an outer peripheral side or an inner peripheral side of the master workpiece, a first detection unit configured to detect contact with a peripheral edge of the tool, an acquisition unit configured to acquire coordinates of the spindle each time the first detection unit detects the contact, and a first generation unit configured to generate a first machining path based on a plurality of coordinates detected by the acquisition unit.

12 Claims, 17 Drawing Sheets

(56)  References Cited

FOREIGN PATENT DOCUMENTS

| | | | | |
|----|----------------|---|---|--------|
| CN | 109531262  | A | | 3/2019 |
| JP | H05-12903  | U | | 2/1993 |
| JP | H05-38660  | A | | 2/1993 |
| JP | 2002205243 | A | * | 7/2002 |
| JP | 2010-89182 | A | | 4/2010 |
| JP | 2011-121139 | A | | 6/2011 |
| JP | 2012-78892 | A | | 4/2012 |
| JP | 2015-3375  | A | | 1/2015 |
| JP | 2018-103307 | A | | 7/2018 |
| JP | 2019-150864 | A | | 9/2019 |

OTHER PUBLICATIONS

Jun. 15, 2021 International Search Report issued in International Patent Application No. PCT/JP2021/012031.

Sep. 29, 2022 International Preliminary Report on Patentability issued in International Patent Application No. PCT/JP2021/012031.

Feb. 27, 2024 extended Search Report issued in European Patent Application No. 21779386.8.

* cited by examiner

1

F I G . 3
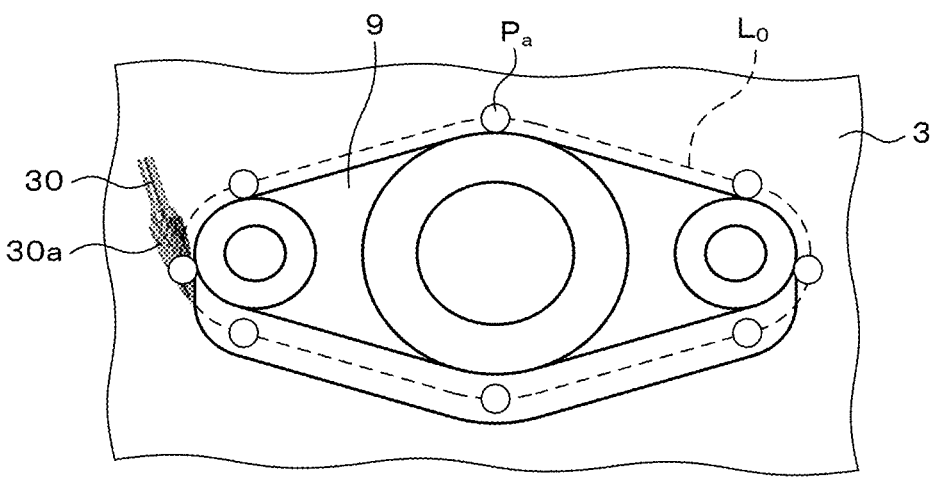

FIG. 6

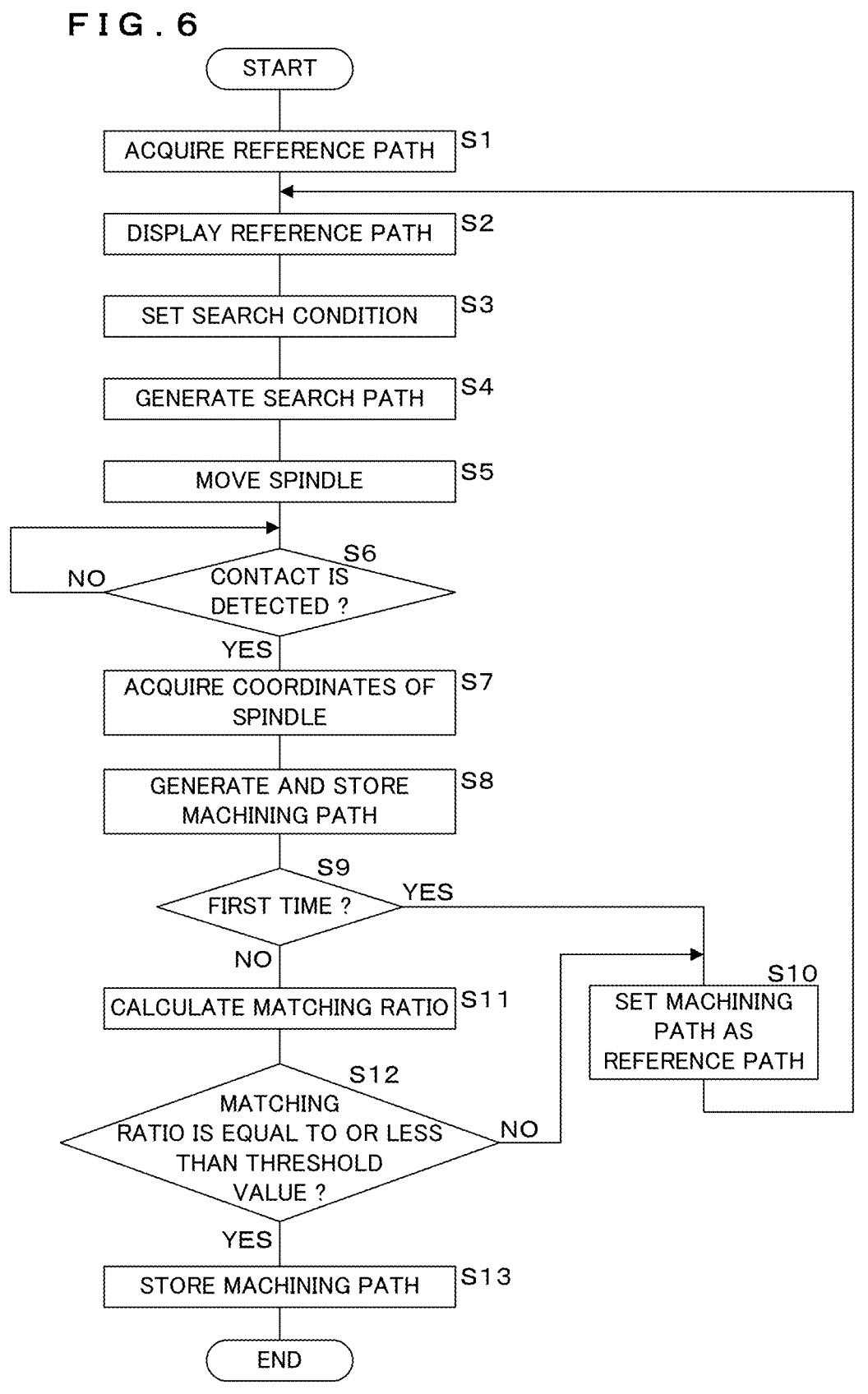

```
                    ( START )
                        │
         ┌──────────────────────────┐
         │  ACQUIRE REFERENCE PATH  │ S1
         └──────────────────────────┘
                        │ ◄──────────────────────────┐
         ┌──────────────────────────┐                │
         │  DISPLAY REFERENCE PATH  │ S2             │
         └──────────────────────────┘                │
                        │                             │
         ┌──────────────────────────┐                │
         │   SET SEARCH CONDITION   │ S3             │
         └──────────────────────────┘                │
                        │                             │
         ┌──────────────────────────┐                │
         │   GENERATE SEARCH PATH   │ S4             │
         └──────────────────────────┘                │
                        │                             │
         ┌──────────────────────────┐                │
         │       MOVE SPINDLE       │ S5             │
         └──────────────────────────┘                │
                        │                             │
                   ┌─────────┐ S6                     │
         NO ◄──────│ CONTACT IS                       │
         │         │ DETECTED ?                       │
         │          └─────────┘                       │
         │              │ YES                         │
         │   ┌──────────────────────────┐             │
         │   │ ACQUIRE COORDINATES OF   │ S7          │
         │   │        SPINDLE           │             │
         │   └──────────────────────────┘             │
         │              │                             │
         │   ┌──────────────────────────┐             │
         │   │  GENERATE AND STORE      │ S8          │
         │   │    MACHINING PATH        │             │
         │   └──────────────────────────┘             │
         │              │                             │
         │         ┌─────────┐ S9    YES              │
         │         │ FIRST TIME ?├──────────┐         │
         │          └─────────┘             │         │
         │              │ NO                │         │
         │   ┌──────────────────────┐       │         │
         │   │ CALCULATE MATCHING RATIO │ S11          │
         │   └──────────────────────┘       │   ┌──────────────┐ S10
         │              │                   │   │ SET MACHINING │
         │         ┌─────────┐              │   │  PATH AS      │
         │         │ MATCHING │             │   │ REFERENCE PATH│
         │    RATIO IS EQUAL TO OR LESS ├─NO─┘   └──────────────┘
         │      THAN THRESHOLD                        │
         │          VALUE ?                           │
         │          └─────────┘                       │
         │              │ YES                         │
         │   ┌──────────────────────────┐             │
         │   │   STORE MACHINING PATH   │ S13         │
         │   └──────────────────────────┘             │
         │              │                             │
         │           ( END )                          │
```

F I G . 11
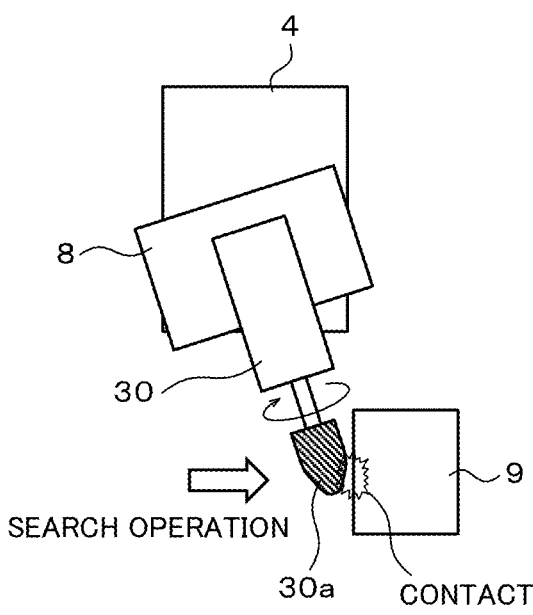

SEARCH OPERATION

30a          CONTACT

FIG. 15

MACHINE TOOL, MACHINING PATH GENERATION METHOD, AND RECORDING MEDIUM

REFERENCE TO RELATED APPLICATIONS

This application is a continuation application of PCT International Application No. PCT/JP2021/012031, which has an International filing date of Mar. 23, 2021 and designated the United States of America, and claiming priority on Patent Application No. 2020-064097 filed in Japan on Mar. 31, 2020. The entire content of the priority application is incorporated herein by reference.

BACKGROUND ART

When removing burrs generated on a surface of a workpiece or polishing a workpiece, an operator attaches a tool to a spindle of a machine tool and moves the spindle to an outer peripheral side of the workpiece to perform machining. Some machine tools have a parallel link mechanism. The parallel link mechanism includes a triangular plate in a plan view, two parallel arms (connecting rods) each having one end rotatably coupled to each side of the plate, and a moving portion rotatably coupled to the other end of each arm. The plate holds the spindle. The moving portion moves in a direction intersecting the plate, and the plate and the spindle move in a desired direction.

A machining path of the spindle is generated by programming from design drawing information of the workpiece (for example, Japanese Patent Laid-Open Publication No. 2019-150864), or is generated using a CAM device.

DESCRIPTION

When the workpiece is die-cast or cast, a shape error with respect to a design drawing is large. Therefore, in the machine tool, during machining, in some cases, the tool and the workpiece do not come into contact with each other to fail machining, or the tool and the workpiece come into contact with each other more than necessary to perform extra machining. Off-line teaching of Japanese Patent Laid-Open Publication No. 2019-150864, etc. for generating a path without directly applying a tool to a master workpiece is a machining method. Even when the shape of the workpiece is accurate, due to various factors such as a spindle movement error, a tool length difference, a tool shape difference, machining origin deviation, etc., off-line teaching is difficult to generate a machining path that closely imitates the surface of the workpiece. In online teaching, in which a tool is directly applied to a master workpiece to teach a path, it takes a lot of time to create a machining path that imitates a distorted workpiece surface, and the machining path varies depending on the operator. Further, when a lot of the workpiece is different, or when a shape of the workpiece or burr changes due to maintenance of a mold, it is significantly complicated to correct the machining path each time.

An object of the disclosure is to provide a machine tool, a machining path generation method, and a recording medium capable of generating a machining path with high accuracy and in a short time.

A machine tool of the disclosure includes a spindle configured to mount a tool thereon, a movement control unit configured to move the spindle toward a peripheral edge of a master workpiece machined with desired accuracy or away from the peripheral edge along a reference path on an outer peripheral side or an inner peripheral side of the master workpiece, a first detection unit configured to detect that the tool comes into contact with the peripheral edge, an acquisition unit configured to acquire coordinates of the spindle each time the first detection unit detects the contact, and a first generation unit configured to generate a first machining path based on a plurality of coordinates acquired by the acquisition unit. The reference path refers to a rough machining path not following the master workpiece. Specifically, the reference path is a path of a machining program used in mass production machining. As described above, when a hole is provided on the inner peripheral side of the master workpiece, the reference path is set on the inner peripheral side of the master workpiece.

According to the above configuration, when the spindle is brought into contact with and separated from the peripheral edge of the master workpiece along the reference path, and contact with the peripheral edge of the tool is detected, the machine tool may acquire coordinates of the spindle, and accurately generate a machining path in a short time based on the coordinates. Therefore, when machining is performed based on the generated machining path, the machine tool has excellent machining accuracy.

In addition, even when the shape of the workpiece changes due to a difference in mold, mold correction, a change in a molding condition, a lot difference, etc., a mounting position shifts due to a change in jig arrangement, or the tool is changed to a tool having a slightly different shape, the machine tool creates a master workpiece each time. Since the machine tool generates a machining path that imitates a surface of the master workpiece, it is possible to reduce the time and effort required to adjust the machining path each time during mass production.

The movement control unit is configured to move the spindle in a zigzag manner along the reference path.

According to the above configuration, the machine tool may efficiently and satisfactorily detect contact.

The movement control unit is configured to move the spindle closer thereto or away therefrom at contact/separation points, the contact/separation points being points provided at a predetermined interval on the reference path.

According to the above configuration, the machine tool may efficiently and satisfactorily detect contact.

The machine tool has a plurality of reference points on the reference path, and the movement control unit is configured to: move the spindle away therefrom based on a third vector, which is a sum of a first vector directed from a center of the spindle toward a shortest one of the reference points in a traveling direction of the spindle and having a predetermined first length and a second vector orthogonal to the first vector and having a predetermined second length, when the first detection unit detects the contact, and move the spindle closer thereto based on a fourth vector having an opposite direction to a direction of the second vector and having a third length longer than the second length.

According to the above configuration, the machine tool may bring the tool vertically into contact with the peripheral edge of the master workpiece and more satisfactorily generate a machining path.

The first machining path includes a line-segment shaped locus or a curved locus of the plurality of coordinates.

According to the above configuration, the machine tool may satisfactorily generate a machining path.

The spindle is rotated by drive of a spindle motor, the machine tool includes a second detection unit configured to detect a load applied to the spindle, and the first detection unit is configured to detect the contact by a change in the load detected by the second detection unit.

According to the above configuration, the machine tool may satisfactorily detect contact.

The second detection unit is configured to detect a rotation speed, torque, or a deviation amount of the spindle when the spindle motor is rotated forward or backward at a low speed.

According to the above configuration, the machine tool may satisfactorily detect contact without causing a flaw in the workpiece.

The machine tool includes a fixing portion configured to fix the spindle, in which the second detection unit comprises a force sensor provided on the fixing portion to detect a force applied to the spindle.

According to the above configuration, the machine tool may satisfactorily and easily detect contact.

The movement control unit is configured to control a moving shaft motor for driving a moving shaft connected to the spindle, the machine tool includes a third detection unit configured to detect a load applied to the moving shaft, and the first detection unit is configured to detect the contact by a change in the load detected by the third detection unit.

According to the above configuration, the machine tool may satisfactorily detect contact.

The machine tool includes a voltage application unit configured to apply a voltage to the spindle, and a current sensor connected to the voltage application unit, in which the first detection unit detects the contact by a current detected by the current sensor.

According to the above configuration, when the tool and the master workpiece are in contact with each other, electricity flows due to a voltage applied to the spindle by the voltage application unit. Since the ammeter detects a flow of electricity, the machine tool may detect contact at low cost.

The movement control unit is configured to move the spindle toward a peripheral edge of the master workpiece or away from the peripheral edge along the first machining path generated by the first generation unit, and the machine tool includes a second generation unit configured to generate a second machining path based on a plurality of coordinates acquired by the acquisition unit, a calculation unit configured to calculate a matching ratio between the first machining path and the second machining path, and a storage unit configured to store the first machining path when the matching ratio calculated by the calculation unit is equal to or less than a predetermined value.

According to the above configuration, the machine tool may generate a machining path more accurately.

A machining path generation method includes holding a master workpiece on a holding table of a machine tool, mounting a tool at a tip of a spindle, moving the spindle toward a peripheral edge of the master workpiece or away from the master workpiece along a reference path on an outer peripheral side or an inner peripheral side of the master workpiece, detecting that the tool comes into contact with the peripheral edge, acquiring coordinates of the spindle each time the contact is detected, and generating a machining path based on a plurality of acquired coordinates.

According to the above configuration, the machine tool may accurately generate the machining path in a short time, and machining accuracy becomes excellent.

A non-transitory computer-readable recording medium records a computer program configured to cause a computer to execute processes of moving a spindle of a machine tool, on which a tool is mounted, toward a peripheral edge of a master workpiece machined or away from the peripheral edge along a reference path on an outer peripheral side or an inner peripheral side of the master workpiece, detecting whether or not the tool comes into contact with the peripheral edge, and acquiring coordinates of the spindle and generating a machining path based on a plurality of acquired coordinates when it is determined that the tool comes into contact with the peripheral edge.

According to the above configuration, the computer program may accurately generate the machining path in a short time, and the machining accuracy becomes excellent.

In a machine tool of the disclosure, a spindle is brought into contact with and separated from a peripheral edge of a master workpiece along a reference path, coordinates of the spindle are acquired when contact of the tool with the peripheral edge is detected, and a machining path can be accurately generated based on the coordinates in a short time. Therefore, machining accuracy is improved.

FIG. 3 is an explanatory diagram for describing generation of a reference path.

FIG. 6 is a flowchart illustrating a procedure of a machining path generation process by a CPU.

FIG. 11 is an explanatory diagram illustrating a first example of a contact detection method.

FIG. 15 is an explanatory diagram for describing search method No. 2.

Figure 1:
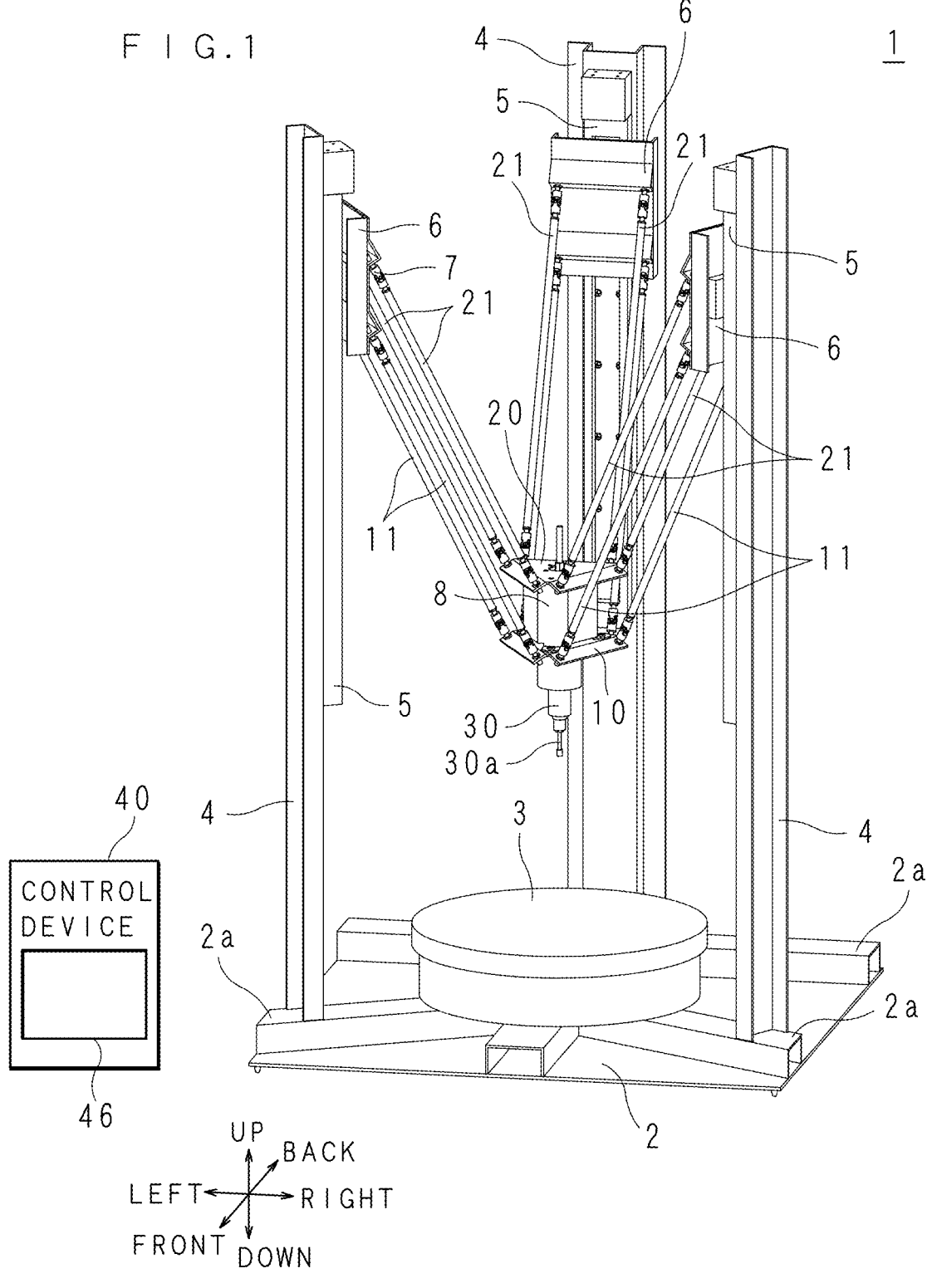
FIG. 1 is a schematic perspective view of a machine tool.

Hereinafter, description will be given with reference to the drawings illustrating a machine tool 1 of the disclosure. In the following description, up, down, front, back, right, and left illustrated in the drawings are used.

The machine tool 1 includes a base 2 having a rectangular shape in a plan view. A plurality of reinforcing cylinders 2a is provided on an upper surface of the base 2. A holding table 3 is provided on the reinforcing cylinders 2a at a center of the base 2. The holding table 3 has a cylindrical shape and holds a workpiece.

Three vertical columns 4 are provided around the holding table 3 and extend upward from the reinforcing cylinders 2a. The three vertical columns 4 are disposed with a phase interval of about 120 degrees in the plan view. Of the side surfaces of each of the vertical columns 4, a track 5 is provided on a side surface on the holding table 3 side, and the track 5 extends in a vertical direction.

A moving portion 6 and a drive source are provided on the track 5. The drive source is, for example, a ball screw 14 and a moving shaft motor 13 (see FIG. 12). The ball screw 14 driven by the moving shaft motor 13 moves the moving portion 6 in the vertical direction along the track 5. That is, the moving portion 6 can move in a direction intersecting a first support plate 10 described later. On a side surface of the moving portion 6 on the holding table 3 side, a mounting portion for mounting a first link 11 and a second link 21 described later is provided. The mounting portion is, for example, a hole or a convex portion.

The first support plate 10 is disposed on the upper side of the holding table 3. The first support plate 10 has a triangular shape in the plan view and is substantially parallel to an upper surface of the holding table 3. Three sides of the first support plate 10 face the three vertical columns 4, respectively. That is, the three sides correspond to three moving portions 6, respectively. Each side and each moving portion 6 are coupled by two parallel first links 11. Each of the first links 11 has a rod shape. One end of each of the two first links 11 is coupled to each of both ends of the side via a rotatable joint 7. The other end of each of the two first links 11 is coupled to the moving portion 6 via a rotatable joint 7. The joint 7 is, for example, a universal joint.

The first support plate 10 holds a spindle 30 protruding upward and downward. The spindle 30 grips a tool 30a at an end.

A second support plate 20 is disposed on an upper side (moving portion 6 side) of the first support plate 10, and a coupling cylinder 8 (connecting portion) with the vertical direction as an axial direction is provided between the first support plate 10 and the second support plate 20. The coupling cylinder 8 couples the first support plate 10 and the second support plate 20 to each other. The coupling cylinder 8 integrates the first support plate 10 and the second support plate 20.

An upper portion of the spindle 30 penetrates the second support plate 20 from the inside of the coupling cylinder 8. The second support plate 20 has a triangular shape in the plan view and is substantially parallel to the first support plate 10. Three sides of the second support plate 20 face the three vertical columns 4, respectively. That is, the three sides correspond to the three moving portions 6, respectively. Each side and each of the moving portions 6 are coupled by two parallel second links 21. Each of the second links 21 has a rod shape. One end of each of the two second links 21 is coupled to each of the both ends of the side via a rotatable joint 7. The other end of each of the two second links 21 is coupled to each of the moving portions 6 via a rotatable joint 7. The joint 7 is, for example, a universal joint.

The coupling cylinder 8 has a hexagonal shape in the plan view, and among six sides of an upper end of the coupling cylinder 8, three sides skipping one in a circumferential direction are coupled to the three sides of the second support plate 20. Among six sides of a lower end of the coupling cylinder 8, three adjacent sides skipping one in the circumferential direction are coupled to the three sides of the first support plate 10.

When the three moving portions 6 are at the same height position, the spindle 30 is located substantially directly above a center of the holding table 3.

When two moving portions 6 are at the same vertical position and the other one moving portion 6 moves below the two moving portions 6, the spindle 30 moves only in a horizontal direction toward the opposite side from the moving portion 6 that moves downward.

When two moving portions 6 are at the same vertical position and the other one moving portion 6 moves above the two moving portions 6, the spindle 30 moves only in the horizontal direction toward the moving portion 6 that moves upward. When the three moving portions 6 move in the vertical direction by the same distance, the spindle 30 moves in the vertical direction. By combining these movements, the machine tool 1 positions the spindle 30 at a desired upper, lower, front, back, right, and left position. Therefore, the spindle 30 is connected to the ball screw 14 via the first support plate 10, the second support plate 20, the coupling cylinder 8, the first links 11, the second links 21, the joints 7, and the moving portions 6.

Figure 2:
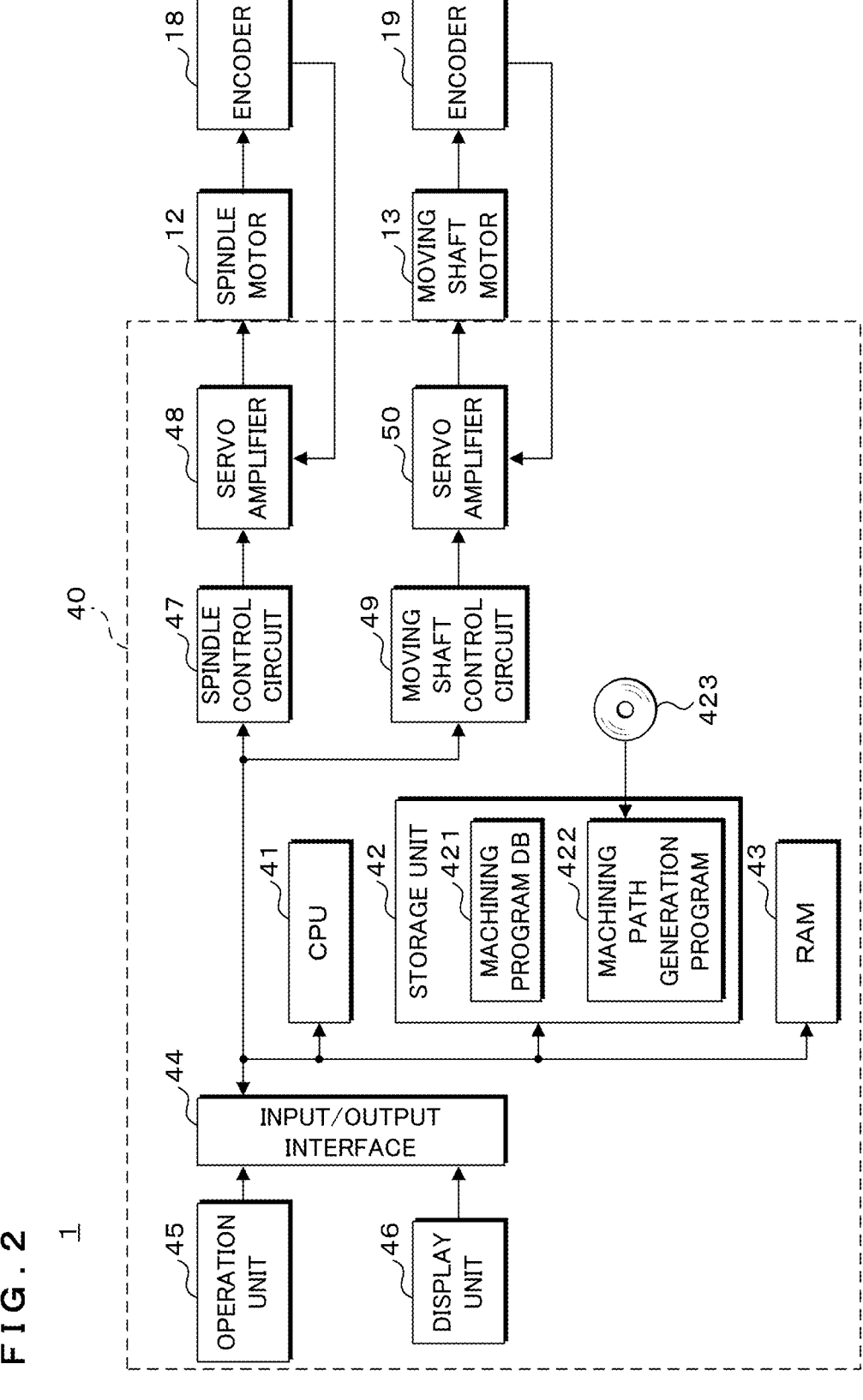
FIG. 2 is a block diagram illustrating a configuration of the machine tool.

The spindle 30 includes a spindle motor 12 (see FIG. 2). The spindle 30 positioned at a desired position is rotated by the spindle motor 12, and the tool 30a mounted on the spindle 30 machines a workpiece held on the holding table 3.

As illustrated in FIG. 2, a control device 40 includes a CPU 41, a storage unit 42, a RAM 43, an input/output interface 44, an operation unit 45, and a display unit 46. The CPU 41 controls an operation of each part of the machine tool 1. The storage unit 42 is rewritable and is an EPROM, an EEPROM, etc. The storage unit 42 stores a control program (not illustrated) for controlling the machine tool 1, a machining program DB 421 for storing a plurality of machining programs for machining a workpiece 95 (see FIG. 5), and a machining path generation program (hereinafter referred to as a program) 422. The program 422 executes a process of generating a machining path. The program 422 is stored in a computer-readable recording medium 423 such as a CD-ROM, a DVD-ROM, or a USB memory, and is stored in the storage unit 42 from the recording medium 423. The program 422 may be acquired from an external computer (not illustrated) connected to a communication network, and then stored in the storage unit 42.

Table 1 below is an example of a storage table of the machining program DB 421. The machining program DB 421 stores a No. column, a machining program column, and a machining path column. The No. column stores a machining program number. The machining program column stores each machining program. The machining path column initially stores a reference path $L_0$ generated by a method such as online teaching using CAM software, etc. When a machining path $L_1$ is generated based on the program 422, the CPU 41 overwrites the machining path $L_1$ in the machining path column and stores the machining path $L_1$.

TABLE 1

| No. | Machining Program | Machining Path |
|---|---|---|
| 1 | Pro (1) | $L_0$ (1) |
| 2 | Pro (2) | $L_0$ (2) |
| . | . | . |
| . | . | . |
| . | . | . |

When an operator operates the operation unit 45, a signal is input from the operation unit 45 to the input/output interface 44. The operation unit 45 is a keyboard, a button, a touch panel, etc. The input/output interface 44 outputs a signal to the display unit 46. The display unit 46 is a liquid crystal display panel, etc., and displays characters, figures, symbols, etc.

The control device 40 further includes a spindle control circuit 47 corresponding to the spindle motor 12, a servo amplifier 48, a moving shaft control circuit 49 corresponding to the moving shaft motor 13, and a servo amplifier 50. Based on a command from the CPU 41, the spindle control circuit 47 outputs an instruction indicating a target value such as a rotation direction or a rotation speed of the spindle motor 12 to the servo amplifier 48. The servo amplifier 48 supplies electric power to the spindle motor 12 based on the instruction. An encoder 18 detects a rotational position and speed of the spindle motor 12 and transmits a detection signal to the servo amplifier 48. The servo amplifier 48 compares the detection signal with the target value and controls output power.

Based on a command from the CPU 41, the moving shaft control circuit 49 outputs an instruction indicating a target value such as a moving direction or a speed of the three moving portions 6 to the servo amplifier 50. The servo amplifier 50 supplies electric power to the moving shaft motor 13 based on the instruction. An encoder 19 detects a rotational position and speed of the moving shaft motor 13 and transmits a detection signal to the servo amplifier 50. The servo amplifier 50 compares the detection signal with the target value and controls output power. The CPU 41 corresponds to a movement control unit.

In the machining path generation method, the deburred master workpiece 9 is held on the holding table 3 of the machine tool 1, and the tool 30a is attached to a tip of the spindle 30. The master workpiece 9 has been deburred, and thus has desired machining accuracy. As illustrated in FIG. 3, the reference path $L_0$ is generated on the outer peripheral side of the master workpiece 9 by a method such as online teaching using a CAM device. The reference path $L_0$ is based on a plurality of teaching points $P_a$ on the reference path $L_0$. FIG. 3 is a perspective view of the master workpiece 9. Based on the program 422, the spindle 30 approaches or moves away from the peripheral edge of the master workpiece 9 along the reference path $L_0$.

Figure 4:
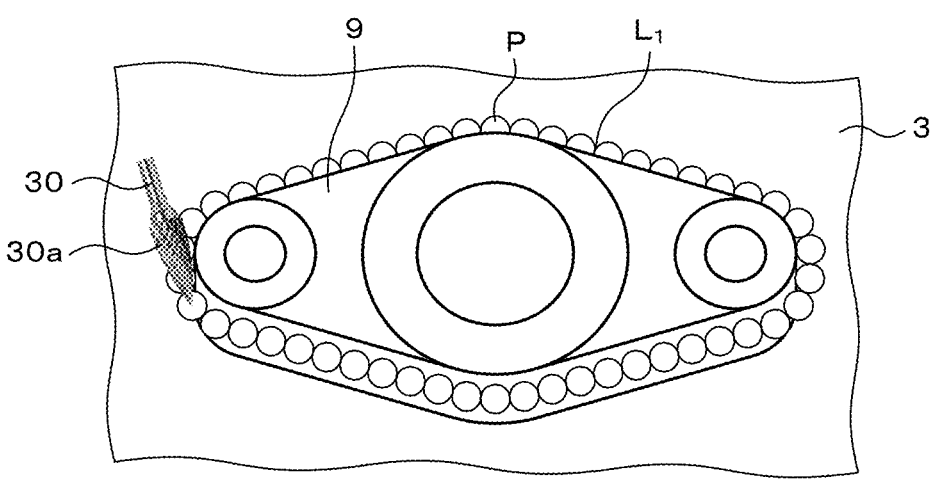
FIG. 4 is an explanatory diagram for describing generation of a machining path.
Figure 5:
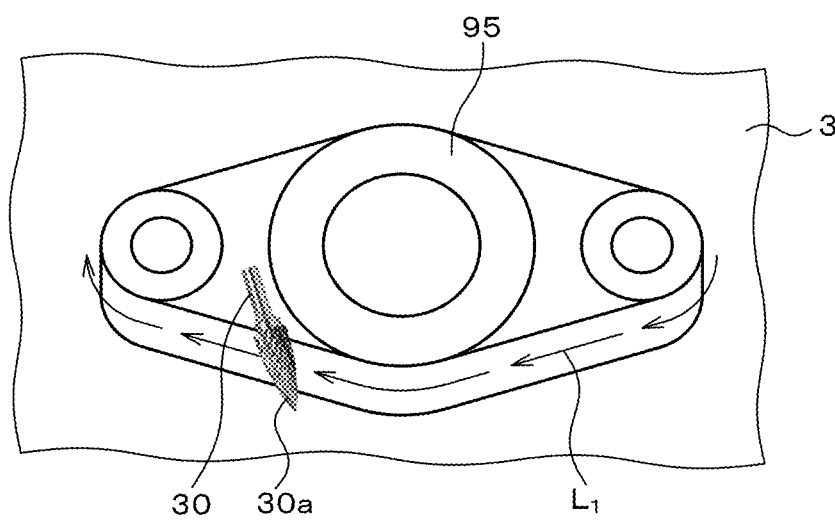
FIG. 5 is an explanatory diagram for describing machining based on a machining path.

The CPU 41 detects contact of the tool 30a with the peripheral edge, and acquires coordinates of a center P of the spindle 30 each time the contact is detected. As illustrated in FIG. 4, the CPU 41 generates the machining path $L_1$ based on the acquired coordinates of a plurality of centers P. When deburring the workpiece 95 having burrs, the workpiece 95 is held on the holding table 3. Based on the corresponding machining program, as illustrated in FIG. 5, the spindle 30, on which the tool 30a is mounted, is moved along the machining path $L_1$ to machine the workpiece 95.

Hereinafter, a method of generating a machining path will be described in detail.

A deburred non-defective workpiece is used as the master workpiece 9, and the operator holds the master workpiece 9 on the holding table 3. The operator attaches the tool 30a to be used to the spindle 30.

FIG. 6 is a flowchart illustrating a procedure of a machining path generation process by the CPU 41. The CPU 41 acquires the reference path $L_0$ (S1). The CPU 41 acquires No. of the machining program based on an operation of the operator, and then acquires the corresponding reference path $L_0$ by referring to the machining program DB 421. Alternatively, the spindle 30 is moved to apply the tool 30a to the master workpiece 9, coordinates of a point indicating a corner of the master workpiece 9 and coordinates of a point where a posture of the tool 30a changes are obtained, the coordinates are set as a teaching point $P_a$, and the reference path $L_0$ is acquired based on the teaching point $P_a$.

Figure 7:
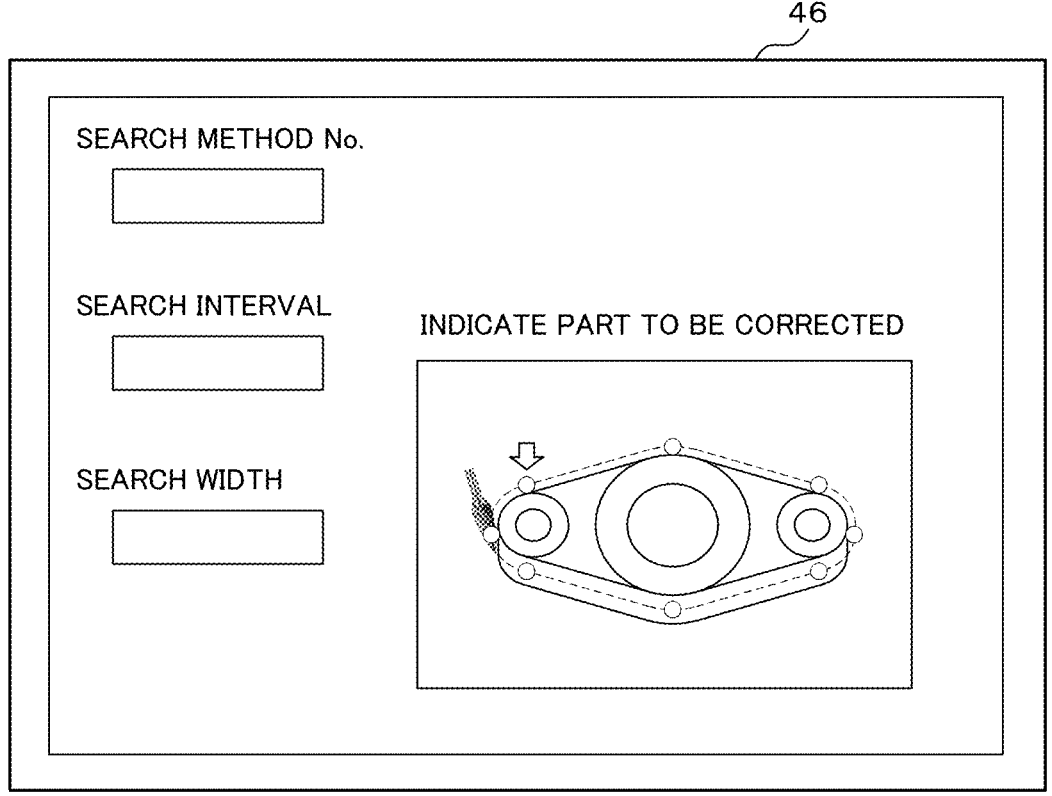
FIG. 7 is an explanatory diagram illustrating an example of a display screen of a display unit.

The CPU 41 displays the reference path $L_0$ and an input field on the display unit 46 (S2). In the input field, conditions such as a search method No., a search interval, and a search width are input. The search method will be described later. FIG. 7 is an example of a display screen of the display unit 46. The CPU 41 displays the master workpiece, the teaching point $P_a$, and the reference path $L_0$ as a perspective view or a plan view at a right side of the display screen. The perspective view or the plan view may be switched by an operation of the operator. The CPU 41 displays the input field at a left side of the display screen. The operator checks the reference path $L_0$ displayed on the display unit 46 by the CPU 41. When there is a part of the reference path $L_0$ to be corrected, the operator indicates the part using the operation unit 45. The operator inputs a search method No., a search interval, and a search width using the operation unit 45. The search interval and search width may be selected by the operator by indicating candidates. The CPU 41 acquires the search method No., the search interval, and the search width input by the operator, and sets a search condition (S3). In the case of second and subsequent times, when the operator inputs a corrected part, a search interval of the corrected part is reduced and a search condition is set (S3).

The CPU 41 generates a search path T based on the reference path $L_0$, and the search interval, the search width, etc., which are set conditions (S4). The CPU 41 rotates the spindle motor 12 at a low speed (forward rotation or backward rotation), and moves the spindle 30 along the search path T using the moving shaft motor 13 (S5). A suitable low speed is 100 to 1000 rpm.

The CPU 41 determines whether or not the master workpiece 9 and the tool 30a are in contact with each other (S6). Upon determining that the master workpiece 9 and the tool 30a are not in contact with each other (S6: NO), the CPU 41 repeats determination of S6. Upon determining that the master workpiece 9 and the tool 30a are in contact with each other (S6: YES), the CPU 41 acquires the coordinates of the center P of the spindle 30 at the time of contact (S7). The CPU 41 generates the machining path $L_1$ based on the coordinates of the plurality of centers P, and stores the machining path $L_1$ in the RAM 43 (S8).

The CPU 41 determines whether or not the machining path $L_1$ is generated for the first time (S9). Upon determining that the machining path $L_1$ is generated for the first time, (S9: YES), the CPU 41 sets the machining path $L_1$ as the reference path $L_0$ (S10), and returns the process to S2. The operator may input a small search interval in order to improve the accuracy, and the CPU 41 sets the input search interval in second condition setting (S3). The CPU 41 generates a search path T based on the new reference path $L_0$, and repeats processing of S4 to S8. In S8, the second machining path $L_1$ is generated. The CPU 41 that generates the second machining path $L_1$ in S8 corresponds to a second generation unit. In S9, when it is determined that the machining path $L_1$ is not generated for the first time (S9: NO), a matching ratio is calculated based on the first machining path $L_1$ for the second machining path $L_1$ (S11). The matching ratio may be expressed as a ratio of the area of a deviation between a portion A surrounded by the first machining path $L_1$ and a portion B surrounded by the second machining path $L_1$ to the area of the portion A. The CPU 41 that executes S11 corresponds to a calculation unit.

The CPU 41 determines whether or not the matching ratio is equal to or less than a threshold value (S12). Upon determining that the matching ratio is not equal to or less than the threshold value (S12: NO), the CPU 41 returns the process to S10. The CPU 41 repeats processing of S2 to S11 before the matching ratio becomes equal to or less than the threshold value. Upon determining that the matching ratio is equal to or less than the threshold value (S12: YES), the CPU 41 overwrites the latest generated machining path $L_1$ in the machining path column of the corresponding No. of the machining program of the machining program DB 421 to store the machining path $L_1$ (S13), and ends the process. The CPU 41 that executes S13 corresponds to a storage unit.

Figure 8:
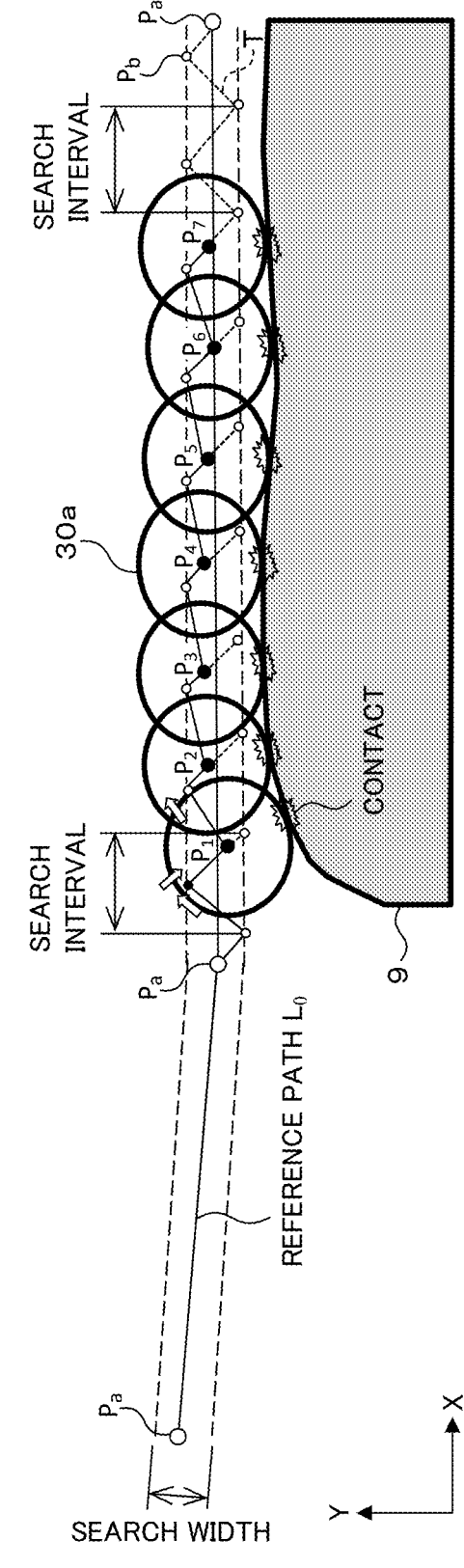
FIG. 8 is an explanatory diagram for describing search method No. 1.

As illustrated in FIG. 8, the reference path $L_0$ is a path initially stored in the machining program DB 421. The plurality of teaching points $P_a$ is included on the reference path $L_0$. The CPU 41 generates a search path T in which the spindle 30 moves in a zigzag manner based on the search interval and the search width set along the reference path $L_0$. In FIG. 8, zigzag, which is a broken line connecting a point $P_b$, is the search path T. The search width is a total width of a movement width in which the spindle 30 approaches the peripheral edge of the master workpiece 9 from a center of the reference path $L_0$ and a movement width in which the spindle 30 is separated from the center, and is a swing width when the spindle 30 moves in a zigzag manner. The search interval is a distance in a traveling direction after the spindle 30 comes closest to the master workpiece 9 until the spindle 30 approaches the master workpiece 9 again. When contact between the tool 30a and the master workpiece 9 is detected, the CPU 41 acquires the coordinates of the center P of the spindle 30. Each time contact is detected, the CPU 41 acquires coordinates of the centers $P_1$, $P_2$, ... $P_7$, ... of the spindle 30.

Figure 9:
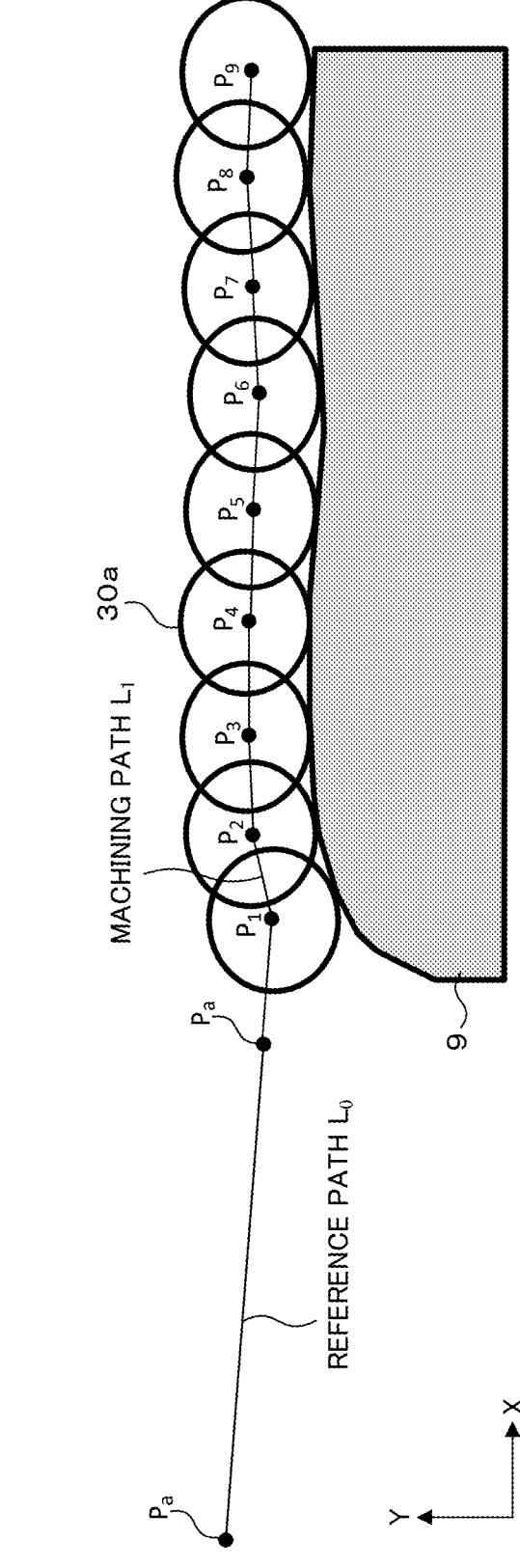
FIG. 9 is an explanatory diagram for describing generation of a machining path.
Figure 10:
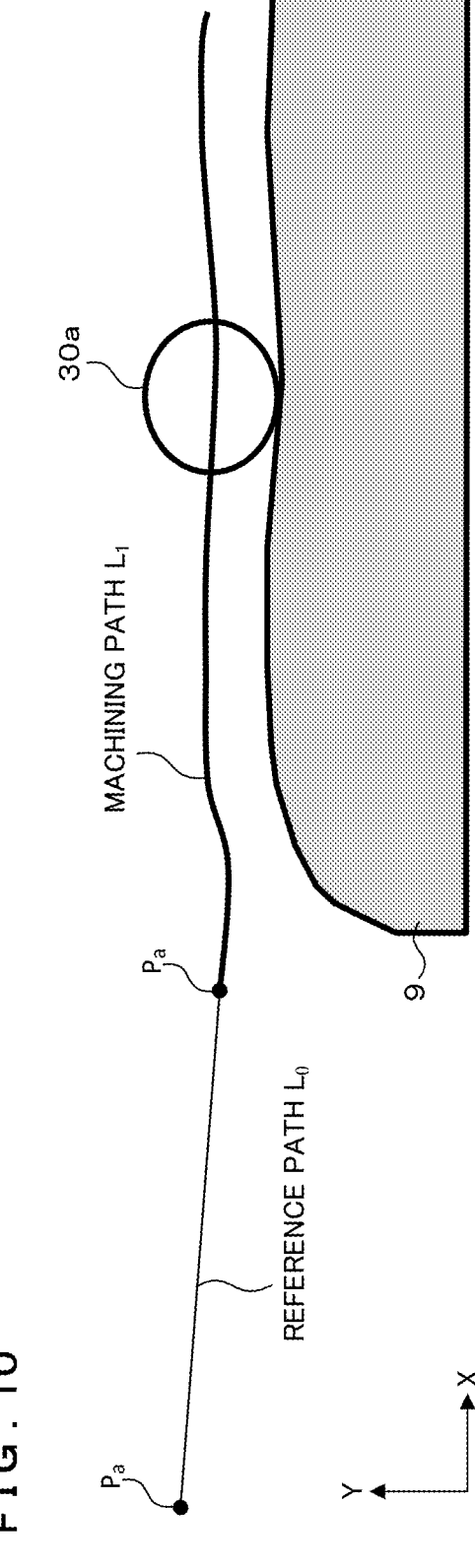
FIG. 10 is an explanatory diagram when a smooth function is used.

As illustrated in FIG. 9, the CPU 41 connects the acquired centers $P_1$, $P_2$, ... $P_7$, ... to generate the machining path $L_1$. Two centers P are not limited to the case where the centers P are connected in a line segment shape, and may be connected in an arc shape or a curved shape. As illustrated in FIG. 10, the CPU 41 may perform correction so that the machining path $L_1$ becomes smooth using a smooth function (method of approximating with a smooth curve). Smooth curves include spline curves, Bezier curves, NURBS curves, etc.

FIG. 11 illustrates the machine tool 1 as a simplified model for the sake of description, and is different from the shape of FIG. 1. The spindle 30 held by the coupling cylinder 8 is disposed on the outer peripheral side at a predetermined position (in a designated horizontal plane) on a side surface of the master workpiece 9 in a state of having a predetermined angle with respect to a longitudinal direction of the vertical column 4. The spindle 30 rotates forward or backward at a low speed, and moves based on the above-mentioned search path T. The CPU 41 detects the load of the spindle 30 corresponding to a signal output by the servo amplifier 48 based on a detection signal of the encoder 18. The CPU 41 detects contact between the tool 30a and the master workpiece 9 based on a change in the detected load. Specifically, the CPU 41 detects the rotation speed of the spindle 30, the amount of change in torque, the amount of deviation, etc. Therefore, the CPU 41 corresponds to a second detection unit.

Figure 12:
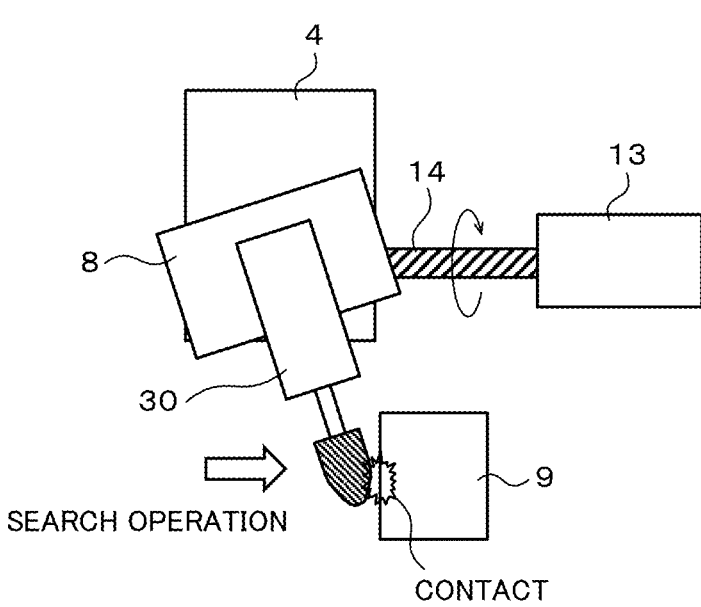
FIG. 12 is an explanatory diagram illustrating a second example of the contact detection method.

FIG. 12 illustrates the machine tool 1 as a simplified model for the sake of description, and is different from the shape of FIG. 1. As described above, the moving shaft motor 13 drives the ball screw 14, and the moving portion moves in the vertical direction along the track. The CPU 41 detects the load of the ball screw 14 corresponding to a signal output by the servo amplifier 50 based on a detection signal of the encoder 19. The CPU 41 detects contact between the tool 30a and the master workpiece 9 based on a change in the detected load. Specifically, the CPU 41 detects the rotation speed of the ball screw 14, the amount of change in torque, the amount of deviation, etc. Therefore, the CPU 41 corresponds to a third detection unit. The ball screw 14 corresponds to a moving shaft.

Figure 13A:
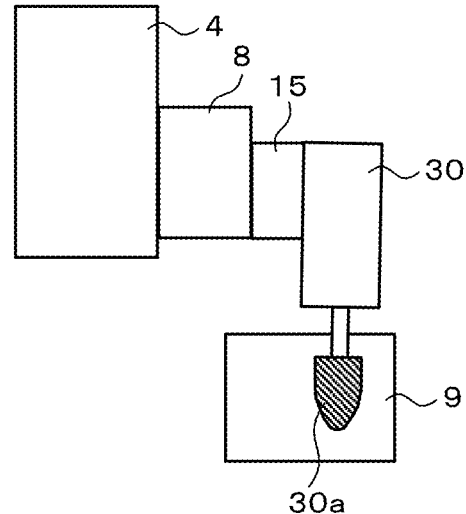
FIG. 13A is a side view illustrating a third example of the contact detection method.
Figure 13B:
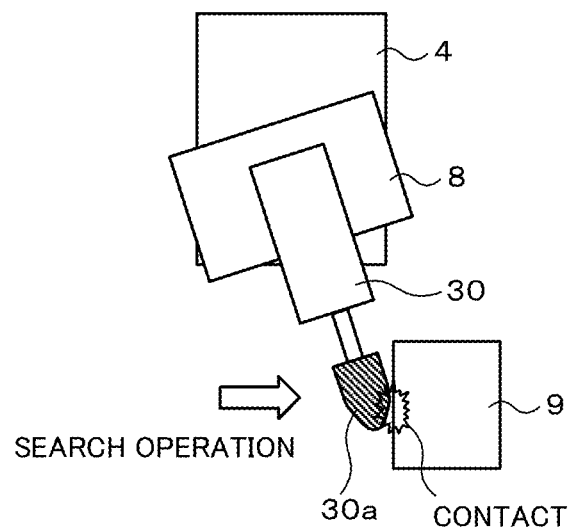
FIG. 13B is a front view illustrating the third example of the contact detection method.

FIGS. 13A and 13B illustrate the machine tool 1 as simplified models for the sake of description, and are different from the shape of FIG. 1. The machine tool 1 is provided with a force sensor 15 between the coupling cylinder 8 and the spindle 30. The force sensor 15 detects the load on the spindle 30, and the CPU 41 detects contact between the tool 30a and the master workpiece 9 based on a change in the detected load. The force sensor 15 corresponds to a second detection unit. The coupling cylinder 8 corresponds to a fixing portion.

Figure 14:
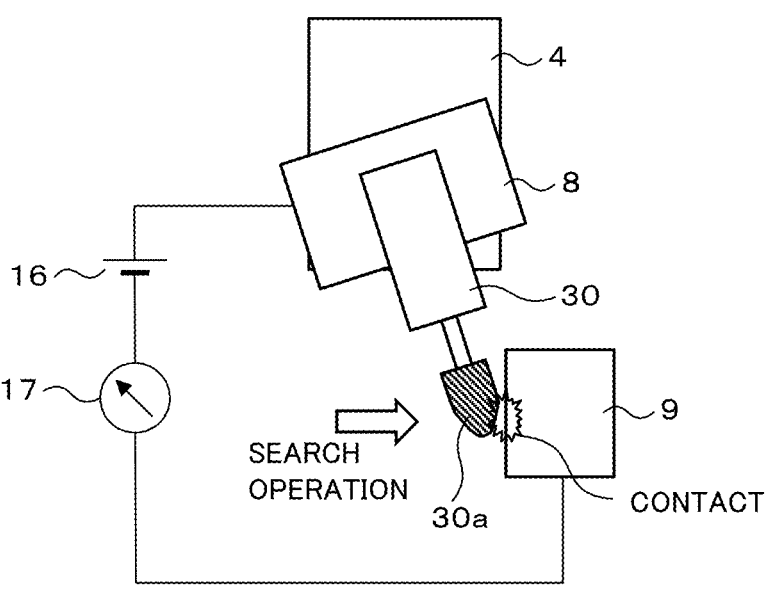
FIG. 14 is an explanatory diagram illustrating a fourth example of the contact detection method.

As illustrated in FIG. 14, a circuit is formed in which the spindle 30 is connected to a +side of a battery 16 (voltage application unit) and the master workpiece 9 is connected to a −side via an ammeter 17. The CPU 41 applies a voltage to the spindle 30, and when the tool 30a comes into contact with the master workpiece 9, electricity flows (energizes) in the circuit. The ammeter 17 detects the electricity. When the master workpiece 9 has no conductivity, a surface of the master workpiece 9 is wetted with a conductive liquid to detect electricity.

In the present embodiment, when the spindle 30 is brought into contact with and separated from the peripheral edge of the master workpiece 9 along the reference path $L_0$, and contact with the peripheral edge of the tool 30a is detected, the coordinates of the center P of the spindle 30 may be acquired, and the machining path $L_1$ may be generated accurately and in a short time based on the coordinates. In the present embodiment, each time the master workpiece 9 is created, the machining path $L_1$ that imitates the surface of the master workpiece 9 is generated. Therefore, even when the shape of the workpiece 95 changes due to a difference in mold, mold correction, a lot difference, etc., or even when a mounting position shifts due to a change in jig arrangement, the disclosure does not require an operation of modifying a program to adjust the machining path at the time of mass production. The reference path $L_0$ is not limited to the case where the reference path $L_0$ is generated on the outer peripheral side of the master workpiece 9. When a hole is provided on the inner peripheral side of the master workpiece 9, the reference path $L_0$ may be generated on the inner peripheral side of the master workpiece 9. The CPU 41 that executes S6 corresponds to a first detection unit, the CPU 41 that executes S7 corresponds to an acquisition unit, and the CPU 41 that executes S8 corresponds to a first generation unit.

Figure 15:
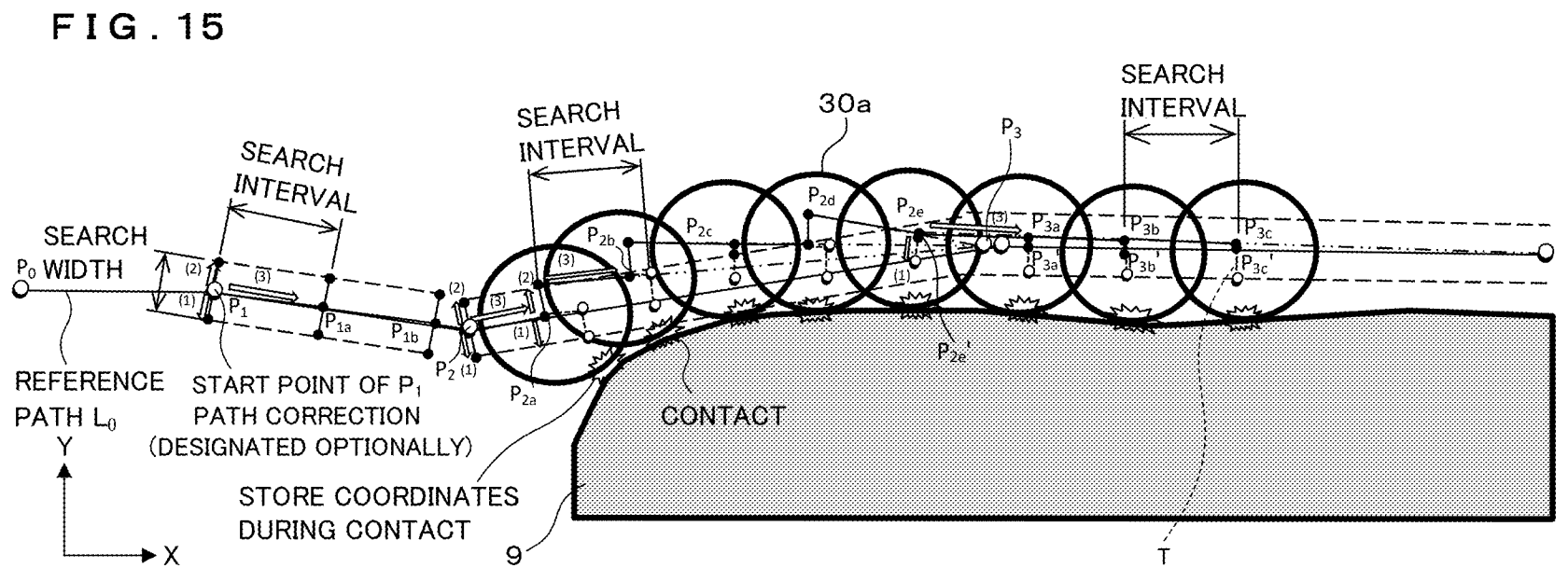

A second embodiment has a configuration similar to that of the first embodiment except that a search method is a method No. 2. As illustrated in FIG. 15, the spindle 30 is moved based on set parameters (search interval and search width) according to the teaching points $P_0$, $P_1$, $P_2$ ... of the reference path $L_0$. That is, the spindle 30 is approached or separated at contact/separation points provided at the search interval on the reference path $L_0$. In the second embodiment, the search path T is generated so that the spindle 30 is brought into contact with and separated from the peripheral edge of the master workpiece 9 at the contact/separation points provided at each search interval along the reference path $L_0$.

Between $P_1$ and $P_2$ (swing and miss)

(i) At the teaching point $P_1$, the spindle 30 is brought closer by half of the search width in a direction (1) perpendicular to a vector from the teaching point $P_1$ to the teaching point $P_2$.

(ii) During non-contact with the master workpiece 9, the spindle 30 is separated by half the search width in an opposite direction (2).

(iii) During non-contact with the master workpiece 9, the spindle 30 returns to the teaching point $P_1$ and moves by the search interval in a direction from the teaching point $P_1$ to the teaching point $P_2$ (direction (3)).

(iv) At a center $P_{1a}$ after movement, the same operation as in (i) to (iii) is performed.

Between $P_2$ and $P_{2e}$ (during contact while moving in (3))

(i) At the teaching point $P_2$, after moving in the direction (1) and the direction (2), the spindle 30 returns to the teaching point $P_2$ and moves by the search interval in a direction from the teaching point $P_2$ to the teaching point $P_3$ (direction (3)). When contact is detected during movement, coordinates of a center $P_{2a}$ of the spindle 30 are stored.

(ii) At the center $P_{2a}$, the spindle 30 is brought closer in the direction (1).

When detection of contact continues, the spindle 30 is separated in the opposite direction (2).

(iii) From a retreat point moved in the direction (2), the spindle 30 moves by the search interval in a direction of the teaching point $P_3$ (direction (3)). When contact is detected during movement, coordinates of a center $P_{2b}$ of the spindle 30 are stored.

(iv) Movement similar to that of the above description is performed.

Between $P_{2e}$ and $P_{3c}$ (during contact while moving in (1))

(i) When a distance from a center $P_{2e}$ to the teaching point $P_3$ is shorter than the search interval, the spindle 30 approaches a vector from the center $P_{2e}$ to the teaching point $P_3$ by half of the search width in the direction (1). At the time of contact with the master workpiece 9, a center $P_{2e}'$ at that time is stored.

(ii) After storage, the spindle 30 returns to the center $P_{2e}$ and moves in a direction from the center $P_{2e}$ to the teaching point $P_3$ (direction (3)) by the search interval.

(iii) Movement similar to that of the above description is performed.

In the present embodiment, the machining path can be accurately generated and in a short time, and the machining accuracy is improved.

Figure 16:
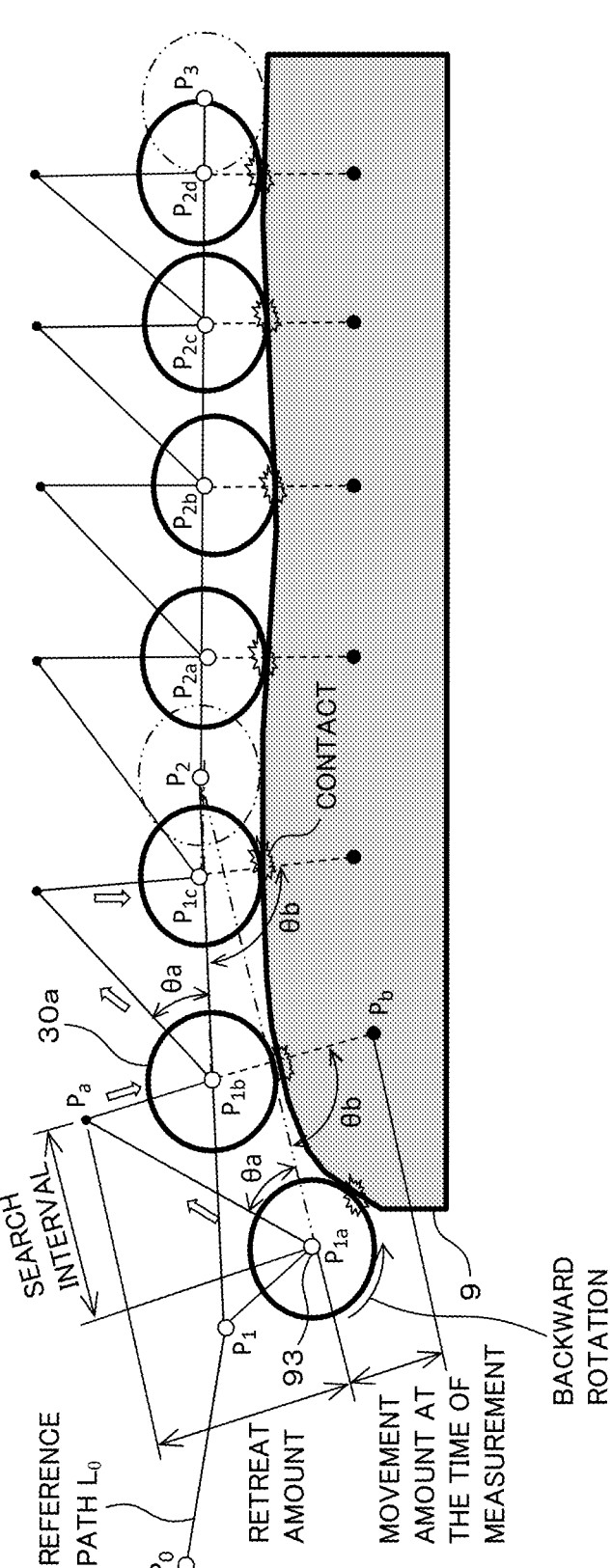
FIG. 16 is an explanatory diagram for describing search method No. 3.

A third embodiment has a configuration similar to that of the first embodiment except that a search method is a method No. 3. As illustrated in FIG. 16, at first, the same approach as that in the first embodiment is performed. However, after first detecting contact, with respect to a vector connecting the center $P_{1a}$ of the spindle 30 at that time and the shortest teaching point $P_2$ in the traveling direction of the spindle 30, a contact/separation operation is performed according to the set search width (retreat amount and movement amount at the time of measurement) and search interval. After contact is detected, the search path is generated based on the vector, the search width, and the search interval.

Figure 17:
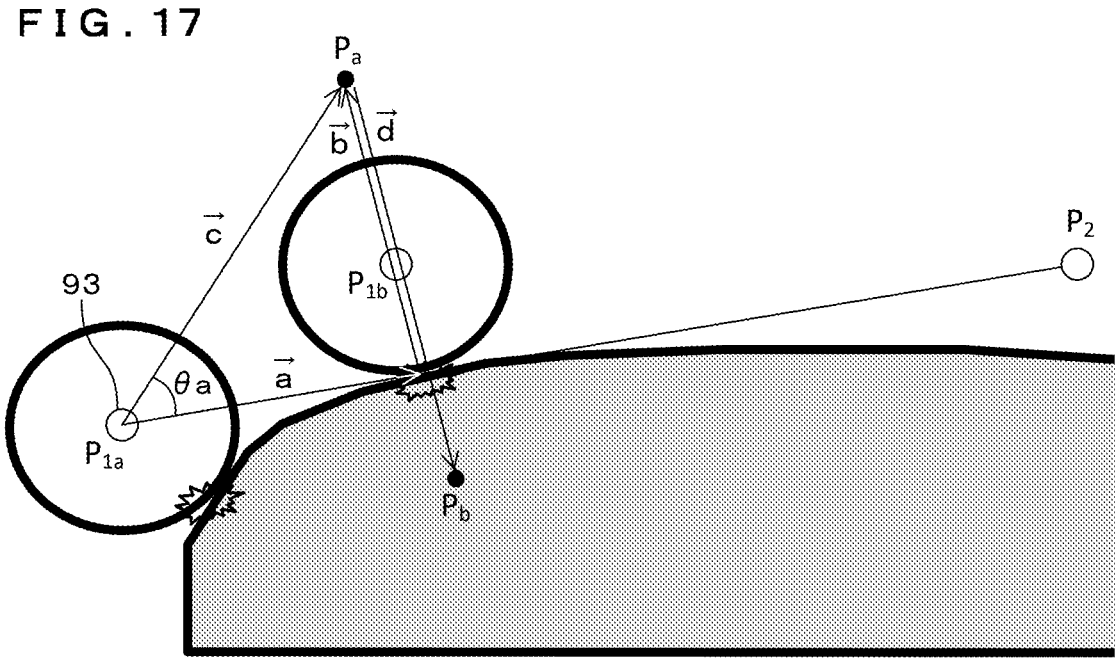
FIG. 17 is a partially enlarged view of FIG. 16.

As illustrated in FIG. 17, the CPU 41 separates the spindle 30 based on a third vector c, which is a sum of a first vector a directed from the center $P_{1a}$ of the spindle 30 toward the teaching point $P_2$ and having a first length (search interval) and a second vector b orthogonal to the first vector a and having a second length (retreat amount). The CPU 41 may obtain the third vector c so as to form $\theta_a$ with respect to the first vector a. Next, the CPU 41 brings the spindle 30 closer based on a fourth vector d having a direction opposite to that of the second vector b and having a third length obtained by adding the movement amount at the time of measurement to the second length. Until contact with the master workpiece

9 is detected, the CPU 41 performs an approaching operation toward an end point $P_b$ of the fourth vector d inside the master workpiece 9.

When a distance between a center $P_{1c}$ of the spindle 30 and the teaching point $P_2$ at the time of contact becomes less than a width of the search interval, the CPU 41 separates the spindle 30 based on a third vector c, which is a sum a first vector a directed from the center $P_{1c}$ toward a next teaching point $P_3$ and having a first length and a second vector b orthogonal to the first vector a and having a second length.

It is to be noted that, as used herein and in the appended claims, the singular forms "a", "an", and "the" include plural referents unless the context clearly dictates otherwise.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A machine tool, comprising:
a spindle configured to mount a tool thereon; and
a processor programmed to:
move the spindle toward a peripheral edge of a master workpiece machined with desired accuracy or away from the peripheral edge along a reference path on an outer peripheral side or an inner peripheral side of the master workpiece, the reference path having a plurality of reference points;
detect that the tool comes into contact with the peripheral edge;
acquire coordinates of the spindle each time the contact is detected;
generate a first machining path based on the acquired plurality of coordinates;
move the spindle away therefrom based on a third vector, which is a sum of a first vector directed from a center of the spindle toward a shortest one of the reference points in a traveling direction of the spindle and having a predetermined first length and a second vector orthogonal to the first vector and having a predetermined second length, when the contact is detected; and
move the spindle closer thereto based on a fourth vector having an opposite direction to a direction of the second vector and having a third length longer than the second length.

2. The machine tool according to claim 1, wherein the processor is programmed to move the spindle in a zigzag manner along the reference path.

3. The machine tool according to claim 1, wherein the processor is programmed to move the spindle closer thereto or away therefrom at contact/separation points, the contact/separation points being points provided at a predetermined interval on the reference path.

4. The machine tool according to claim 1, wherein the first machining path includes a line-segment shaped locus or a curved locus of the plurality of coordinates.

5. The machine tool according to claim 1, wherein the spindle is rotated by drive of a spindle motor, the processor is programmed to detect a load applied to the spindle, and the processor is programmed to detect the contact by a change in the detected load.

6. The machine tool according to claim 5, wherein the processor is programmed to detect a rotation speed, torque, or a deviation amount of the spindle when the spindle motor is rotated forward or backward at a low speed.

7. The machine tool according to claim 5, comprising:

a fixing portion configured to fix the spindle, and a force sensor provided on the fixing portion to detect a force applied to the spindle.

8. The machine tool according to claim 1, wherein the processor is programmed to control a moving shaft motor for driving a moving shaft connected to the spindle, the processor is programmed to detect a load applied to the moving shaft, and the processor is programmed to detect the contact by a change in the detected load.

9. The machine tool according to claim 1, comprising:

a battery applying a voltage to the spindle; and a current sensor connected to the battery, wherein the processor detects the contact by a current detected by the current sensor.

10. The machine tool according to claim 1, wherein the processor is programmed to move the spindle toward a peripheral edge of the master workpiece or away from the peripheral edge along the generated first machining path, the processor is programmed to generate a second machining path based on the acquired plurality of coordinates, the processor is programmed to calculate a matching ratio between the first machining path and the second machining path, and the machine tool comprises a storage unit configured to store the first machining path when the calculated matching ratio is equal to or less than a predetermined value.

11. A machining path generation method, comprising:

holding a master workpiece machined with desired accuracy on a holding table of a machine tool;

mounting a tool at a tip of a spindle;

moving the spindle toward a peripheral edge of the master workpiece or away from the master workpiece along a reference path on an outer peripheral side or an inner peripheral side of the master workpiece, the reference path has a plurality of reference points;

detecting that the tool comes into contact with the peripheral edge;

acquiring coordinates of the spindle each time the contact is detected;

generating a machining path based on a plurality of acquired coordinates;

moving the spindle away therefrom based on a third vector, which is a sum of a first vector directed from a center of the spindle toward a shortest one of the reference points in a traveling direction of the spindle and having a predetermined first length and a second vector orthogonal to the first vector and having a predetermined second length, when detecting the contact; and moving the spindle closer thereto based on a fourth vector having an opposite direction to a direction of the second vector and having a third length longer than the second length.

12. A non-transitory computer-readable recording medium recording a computer program configured to cause a computer to execute processes of:

moving a spindle of a machine tool, on which a tool is mounted, toward a peripheral edge of a master workpiece machined with desired accuracy or away from the peripheral edge along a reference path on an outer peripheral side or an inner peripheral side of the master workpiece the reference path having a plurality of reference points;

detecting whether or not the tool comes into contact with the peripheral edge; and acquiring coordinates of the spindle and generating a machining path based on a plurality of acquired coordinates when it is determined that the tool comes into contact with the peripheral edge;

moving the spindle away therefrom based on a third vector, which is a sum of a first vector directed from a center of the spindle toward a shortest one of the reference points in a traveling direction of the spindle and having a predetermined first length and a second vector orthogonal to the first vector and having a predetermined second length, when detecting the contact; and moving the spindle closer thereto based on a fourth vector having an opposite direction to a direction of the second vector and having a third length longer than the second length.

* * * * *